US006956885B2

(12) United States Patent
Taylor et al.

(10) Patent No.: US 6,956,885 B2
(45) Date of Patent: Oct. 18, 2005

(54) ELECTROMAGNETIC RADIATION GENERATION USING A LASER PRODUCED PLASMA

(75) Inventors: Alan G. Taylor, London (GB); David R. Klug, London (GB); Ian P. Mercer, Keymer (GB); Daniel A. Allwood, Durham (GB)

(73) Assignee: Powerlase Limited, Crawley (GB)

( * ) Notice: Subject to any disclaimer, the term of this patent is extended or adjusted under 35 U.S.C. 154(b) by 0 days.

(21) Appl. No.: 10/363,284

(22) PCT Filed: Aug. 30, 2001

(86) PCT No.: PCT/GB01/03871

§ 371 (c)(1),
(2), (4) Date: Sep. 8, 2003

(87) PCT Pub. No.: WO02/19781

PCT Pub. Date: Mar. 7, 2002

(65) Prior Publication Data

US 2005/0100071 A1 May 12, 2005

(30) Foreign Application Priority Data

Aug. 31, 2000 (GB) .................................... 0021455
Aug. 31, 2000 (GB) .................................... 0021458
Aug. 31, 2000 (GB) .................................... 0021459

(51) Int. Cl.[7] ................................................ H01S 3/22
(52) U.S. Cl. ............................ 372/55; 372/57; 372/34; 372/76
(58) Field of Search .............................. 372/55–60, 34, 372/35, 76; 257/428

(56) References Cited

U.S. PATENT DOCUMENTS

| | | | |
|---|---|---|---|
| 3,564,454 | A | 2/1971 | Hook et al. |
| 3,569,860 | A | 3/1971 | Booth |
| 4,233,587 | A | 11/1980 | Augustine |
| 4,778,263 | A | 10/1988 | Foltyn |
| 4,910,116 | A | 3/1990 | Nakia et al. |

(Continued)

FOREIGN PATENT DOCUMENTS

DE 19819707 11/1999

(Continued)

OTHER PUBLICATIONS

Rymell L., et al., "Liquid-jet target laser-plasma sources for EUV and X-ray lithography." Microelectronic Engineering, Elsevier Publishers BV., Amsterdam, NL, vol. 48, No. 1-4, May 1999, pp. 453-455, XP004170761, ISSN: 0167-9317.

(Continued)

*Primary Examiner*—Min Sun Harvey
*Assistant Examiner*—Delma R. Flores-Ruiz
(74) *Attorney, Agent, or Firm*—Reinhart Boerner Van Deuren s.c.

(57) ABSTRACT

An extreme ultraviolet radiation generator is disclosed in which Xenon gas is continuously ejected from a high pressure nozzle into a low pressure chamber to generate Xenon atom clusters which are irradiated with a high repetition rate pulsed laser to form a plasma and yield quasi-continuous EUV generation. The nozzle has a beveled outer rim to enable the focus point of the laser light to be brought close to the nozzle. The nozzle is cooled to a temperature at which background Xenon gas condenses onto the nozzle forming a protective layer. A gas compressor serves to recirculate the Xenon gas and batch purification triggered by a mass spectrometer monitoring gas purity may be periodically applied.

30 Claims, 3 Drawing Sheets

U.S. PATENT DOCUMENTS

| | | | | |
|---|---|---|---|---|
| 4,910,166 | A | | 3/1990 | Dholakia |
| 5,033,058 | A | | 7/1991 | Cabaret et al. |
| 5,086,254 | A | | 2/1992 | Wells |
| 5,394,420 | A | | 2/1995 | Senn et al. |
| 5,441,803 | A | | 8/1995 | Meissner |
| 5,471,491 | A | | 11/1995 | Phillips et al. |
| 5,485,482 | A | | 1/1996 | Selker |
| 5,563,899 | A | | 10/1996 | Messiner |
| 5,569,399 | A | | 10/1996 | Penney et al. |
| 5,572,541 | A | | 11/1996 | Suni |
| 5,577,092 | A | * | 11/1996 | Kublak et al. .............. 378/119 |
| 5,636,239 | A | | 6/1997 | Bruesselbach et al. |
| 5,774,488 | A | | 6/1998 | Kmetec |
| 5,846,638 | A | | 12/1998 | Meissner |
| 5,852,622 | A | | 12/1998 | Meissner et al. |
| 5,936,984 | A | | 8/1999 | Meissner et al. |
| 5,943,351 | A | | 8/1999 | Zhou et al. |
| 5,978,407 | A | | 11/1999 | Chang et al. |
| 6,002,744 | A | | 12/1999 | Hertz |
| 6,011,267 | A | | 1/2000 | Kubiak et al. |
| 6,031,241 | A | | 2/2000 | Silfvast et al. |
| 6,039,632 | A | | 3/2000 | Robertson |
| 6,084,198 | A | | 7/2000 | Birx |
| 6,133,577 | A | | 10/2000 | Gutowski et al. |
| 6,160,934 | A | | 12/2000 | Beach et al. |
| 6,193,711 | B1 | | 2/2001 | Connors et al. |
| 6,418,156 | B1 | | 7/2002 | Peressini |

FOREIGN PATENT DOCUMENTS

| | | |
|---|---|---|
| EP | 0370620 | 5/1990 |
| EP | 0854551 | 1/1997 |
| EP | 0 858 249 A1 | 12/1998 |
| JP | 61287287 | 12/1986 |
| JP | 63211779 | 9/1988 |
| JP | 030102888 | 9/1989 |
| JP | 10303480 | 11/1998 |
| WO | WO97/17746 | 11/1995 |
| WO | WO98/34234 | 2/1997 |
| WO | WO00/60709 | 3/1999 |
| WO | WO01/24325 | 9/1999 |
| WO | WO01/30122 | 10/1999 |
| WO | WO 99/51356 A1 | 10/1999 |
| WO | WO01/49087 | 12/1999 |

OTHER PUBLICATIONS

Bergmann et al. "Highly Repetitive, Extreme-Ultraviolet Radiation Source Based on a Gas-Discharge Plasma" Applied Optics, vol. 38, Iss. 25, pp. 5413-5417, Sep. 1999.

CLEO 2002, CTh013 Simple and Efficient Pumping Scheme for Side Pumped Diode Lasers.

* cited by examiner

ELECTROMAGNETIC RADIATION GENERATION USING A LASER PRODUCED PLASMA

CROSS-REFERENCE TO RELATED APPLICATIONS

This application claims priority of International Application Number PCT/GB01/03871, which was filed on Aug. 30, 2001, and published as International Publication Number WO 02/19781 A1 on Mar. 7, 2002 (the "'871 application"), and which in turn claims priority from Great Britain Patent Application Number 0021455.1, filed on Aug. 31, 2000 (the "'455 application"), from Great Britain Patent Application Number 0021458.5, filed on Aug. 31, 2000 (the "'458 application"), and from Great Britain Patent Application Number 0021459.3, filed on Aug. 31, 2000 (the "'459 application"). The '871 application, the '455 application, the '458 application, and the '459 application are all hereby incorporated herein by reference.

BACKGROUND OF THE INVENTION

Field of the Invention

The present invention relates generally to the field of the production of electromagnetic radiation from a laser produced plasma, and more particularly to the generation of electromagnetic radiation, such as extreme ultraviolet radiation, using a plasma produced by directing laser light onto target matter produced by expelling a gas at high pressure from a nozzle.

Lasers may have peak power outputs as high as many terawatts ($10^{12}$ W) and when this energy is tightly focused onto a solid or into a gas, the material is rapidly heated and ionized to form a plasma. Materials at kilo-electron volt (keV) temperatures are in the plasma state. During laser production of a plasma, the plasma will typically be heated to kilo-electron volt temperatures and the surface plasma will ablate, i.e. expand freely into the surrounding vacuum at its sound speed, exerting a very high thermal pressure of up to $10^{11}$ Pascal. As the plasma ablates it expands and cools adiabatically. As it cools recombination of the ionized plasma occurs and electrons cascade down through the atomic states resulting in emission of high energy radiation (such as extreme ultraviolet (EUV)) as the electrons decay to their lower energy states. The duration of the laser pulse may vary from several nanoseconds down to about 10 femtoseconds depending on the application and the method of production.

The generation of EUV radiation is useful in the fields of materials science, microscopy and microlithography amongst others. Currently integrated circuits are formed by a process using deep UV light which has a wavelength of about 308 or 248 or $193\times10^{-9}$ m which can be used to create integrated circuit features down to below $250\times10^{-9}$ m in width (limited by diffraction effects). It has been proposed that EUV radiation which has a wavelength of 10–15 nm, could be used to etch smaller integrated circuit features desirable for improved integrated circuit performance. Thus, the reliable production of high intensity EUV radiation is an important goal.

As explained above, one method of producing EUV radiation is to direct powerful lasers on a target material of high atomic mass and high atomic number. In order to produce a plasma, the target material must have an electron density which exceeds a critical density. Solid metal targets can be used when irradiated by high intensity pulsed lasers to produce a plasma above the target surface. However, the high pressure exerted back onto the target by the expanding plasma results in the production of high velocity particulate ejecta which can damage the optics of the nearby laser EUV optical collection systems. Even small amounts of debris can do considerable damage, e.g. by dramatically reducing the reflectance of mirrors.

One way of reducing the plasma's particulate ejecta is to use a target source of atomic molecular clusters. Inert noble gases such as Xenon are typically used. The molecular cluster targets are produced by free-jet expansion of a gas through a nozzle. The gas is fed into the nozzle inlet at high pressure and is ejected at force through a nozzle outlet into a low pressure chamber. The gas undergoes isentropic expansion in the low pressure chamber which results in cooling. Clusters form when the gas temperature drops sufficiently so that the thermal motion of the Xenon atoms cannot overcome the weakly attractive Van der Waals forces between the atoms. The precise geometry of the nozzle determines important properties of the source jet such as the density and degree of clustering, and in turn these properties determine the intensity of the emitted EUV radiation. Each gas cluster may be thought to act like a microscopic solid particle target for laser plasma generation.

A discussion of EUV generating systems of the above general type may be found in U.S. Pat. No. 5,577,092 and U.S. Pat. No. 6,011,267, which patents are hereby incorporated herein by reference.

SUMMARY OF THE INVENTION

The disadvantages and limitations of the background art discussed above are overcome by the present invention. Viewed from one aspect the present invention provides apparatus for generating electromagnetic radiation at or below ultraviolet wavelengths, said apparatus comprising: a low pressure chamber; a nozzle projecting into said low pressure chamber and operable to pass a continuous flow of a fluid at high pressure into said low pressure chamber, said fluid being subject to cooling through expansion to yield matter suitable for use as a laser target and gas; one or more optical elements operable to direct laser light onto said matter to generate a plasma emitting electromagnetic radiation at or below ultraviolet wavelengths; and a fluid recirculation apparatus for generating electromagnetic radiation at or below ultraviolet wavelengths, said fluid recirculation apparatus comprising: a low pressure chamber; a nozzle projecting into said low pressure chamber and operable to pass a continuous flow of a fluid at high pressure into said low pressure chamber, said fluid being subject to cooling through expansion to yield matter suitable for use as a laser target and gas; one or more optical elements operable to direct laser light onto said matter to generate a plasma emitting electromagnetic radiation at or below ultraviolet wavelengths; and a fluid recirculation circuit for recirculating fluid from the low pressure chamber back to the nozzle including a purification unit for purifying the fluid.

Preferably the fluid recirculation circuit comprises a gas pumping system comprising at least a series connected connector of at least one blower pump together with another pump operable to evacuate from said low pressure chamber.

The production of high intensity ultraviolet and below light is strongly desirable and is aided by the use of a continuous flow of fluid through the nozzle rather than the more typical pulsed flow. It is normally regarded that continuous flow would not be practical due to the high pumping requirements necessary to keep the pressure within the low pressure chamber from building to too high a level. However, an embodiment of the invention uses a series connected blower pump and piston pump to evacuate up to 30 liters per minute of standard pressure gas from the low pressure chamber and it has been found that this combined with continuous flow produces a working system capable of high intensity output (including EUV).

The gas pumping system is further improved in embodiments in which there is provided a series connection of one or more blower pumps together with a rotary pump and/or a piston pump. Each blower pump is preferably a Roots blower.

With the continuous flow of gas into the low pressure chamber, this may be advantageously subject to high repetition rate laser pulses to generate the plasma using pulses of between 1 kHz and 100 kHz and more preferably between 2 kHz and 20 kHz. This gives a quasi-continuous EUV source.

With such continuous operation, the high volumes of gas consumed would normally represent a significant economic barrier. However, recirculating the gas through a compressor enables such continuous operation to become a more practical consideration.

With such recirculation, preferred embodiments also provide a purification unit, which may be triggered by a mass spectrometer used to monitor gas purity, that serves to batch purify the gas as required.

It will be appreciated that the high pressure fluid passing through the nozzle could be in a liquid or fluid state prior to expansion into the low pressure chamber. However, preferred operation is achieved when the fluid is a gas. A particularly suitable gas is Xenon gas.

While the wavelength of the radiation produced could vary depending upon the nature of the plasma produced, which in turn will be influenced by the nature of the gas and the laser light, the present invention is particularly well suited to the generation of extreme ultraviolet light.

The electromagnetic radiation produced by the systems of the present invention may be useful in a wide range of applications, but is particularly well suited as a radiation source for use within an integrated circuit lithography system.

Viewed from another aspect the present invention provides a method of generating electromagnetic radiation at or below ultraviolet wavelengths, said method comprising the steps of passing a fluid at high pressure into a low pressure chamber through a nozzle, said fluid being subject to cooling through expansion to yield matter suitable for use as a laser target and gas; focusing laser light onto said matter to generate a plasma emitting electromagnetic radiation at or below ultraviolet wavelengths; recirculating said fluid from the lower pressure chamber to the nozzle via a recirculation circuit including a purification unit; and purifying said gas in said purification unit.

Viewed from another aspect the present invention provides apparatus for generating electromagnetic radiation at or below ultraviolet wavelengths, said apparatus comprising: a low pressure chamber; a nozzle projecting into said low pressure chamber and operable to pass a fluid at high pressure into said low pressure chamber, said fluid being subject to cooling through expansion to yield matter suitable for use as a laser target and gas; and one or more optical elements operable to direct laser light onto said matter to generate a plasma emitting electromagnetic radiation at or below ultraviolet wavelengths.

Viewed from a further aspect the present invention provides apparatus for generating electromagnetic radiation at or below ultraviolet wavelengths, said apparatus comprising: a low pressure chamber; a nozzle projecting into said low pressure chamber and operable to pass a fluid at high pressure from a nozzle outlet into said low pressure chamber, said fluid being subject to cooling through expansion to yield matter suitable for use as a laser target; and one or more optical elements operable to focus laser light onto said matter to generate a plasma emitting electromagnetic radiation at or below ultraviolet wavelengths; wherein said nozzle has a beveled outer rim portion and said one or more optical elements are disposed to focus said laser light onto said matter along a converging path which would be at least partially blocked by an outer rim flush with said nozzle outlet at an outer diameter of said nozzle that would be present if said nozzle did not have said beveled outer rim portion.

The invention also recognizes that in doing this the geometry of the nozzle needs to be adapted such that the converging laser light is not blocked by the outer rim of the nozzle. In this way, the intensity of the electromagnetic radiation can be increased while maintaining a large cone angle. A further advantage that may result is that the beveled rim of the nozzle may be less subject to damage from the plasma as it is at a generally more acute angle to the plasma.

Reducing nozzle erosion reduces the likelihood of debris reaching the optical elements and contaminating them.

It will be appreciated that while the beveled outer rim portion need only be provided upon the side of the nozzle from which the laser light is incident, the manufacturing of the nozzle may be simplified and the advantages of increased erosion resistance extended if the beveled outer rim extends around the complete nozzle.

It will be appreciated that the outer wall of the nozzle could have many different cross sections. As an example, the outer wall of the nozzle could have a square cross section with one edge of the outer rim being beveled to avoid interfering with the incident laser light. However, in preferred embodiments of the invention the outer wall of the nozzle has a circular cross section as this generally eases manufacturing and provides the required strength to the nozzle while not providing a nozzle that is too big as a subject for plasma erosion and contamination generation.

While the beveled outer rim portion can have various different profiles providing they avoid interfering with the incident laser light, a preferred profile is flat in that this is convenient to manufacture, provides good strength and can yield a constant acute angle between the outer rim beveled face and the potentially damaging plasma. In the preferred embodiment the beveled rim terminates at an acute angle reducing the surface area of the nozzle end and hence the area most exposed to debris.

While the relative dispositions of the optical elements and the nozzle with its beveled outer rim portion could have many combinations, it is preferred that the beveled outer rim portion is sloped at an angle greater than the angle of convergence of the laser light. This allows a considerable degree of flexibility of the way in which the nozzle may be positioned relative to the laser light without the nozzle blocking the laser light. The provision of a bevel also provides robustness/structural strength and reduced occlusion of the radiation source.

The expansion of gas from the nozzle and the resistance to erosion of the nozzle may be further improved when the nozzle has a beveled inner rim surrounding the nozzle outlet.

While the nozzle could have various dimensions, it has been found that particularly good results are achieved when the nozzle outlet has a diameter of between 0.00001 m and 0.002 m. When the nozzle has a beveled inner rim, then the diameter of the outer end of the opening may preferably be increased up to 0.003 m. The nozzle walls preferably have a thickness of between 0.0004 m and 0.002 m.

In preferred embodiments of the invention the nozzle is mounted on a translation stage. This allows the nozzle to be accurately positioned relative to the optics to bring the focus point of the laser light accurately to a position close to the outlet of the nozzle thereby increasing the electromagnetic radiation generation intensity while avoiding the nozzle blocking the incident laser light.

In another form the invention provides an apparatus for generating electromagnetic radiation comprising a nozzle arranged to expel target matter and a laser arranged to direct laser light onto the target matter, in which the nozzle has a beveled end.

In another form the invention provides apparatus for generating electromagnetic radiation comprising a nozzle arranged to expel target matter, a laser arranged to direct laser light onto the target matter, a detector for detecting a focal point of the laser light and a controller, in which at least one of the nozzle and laser are mounted on a translation stage and the controller is arranged to move the translation stage dependent on the detected focal point.

DESCRIPTION OF THE DRAWINGS

These and other advantages of the present invention are best understood with reference to the drawings, in which.

DETAILED DESCRIPTION OF THE PREFERRED EMBODIMENT

Figure 1:
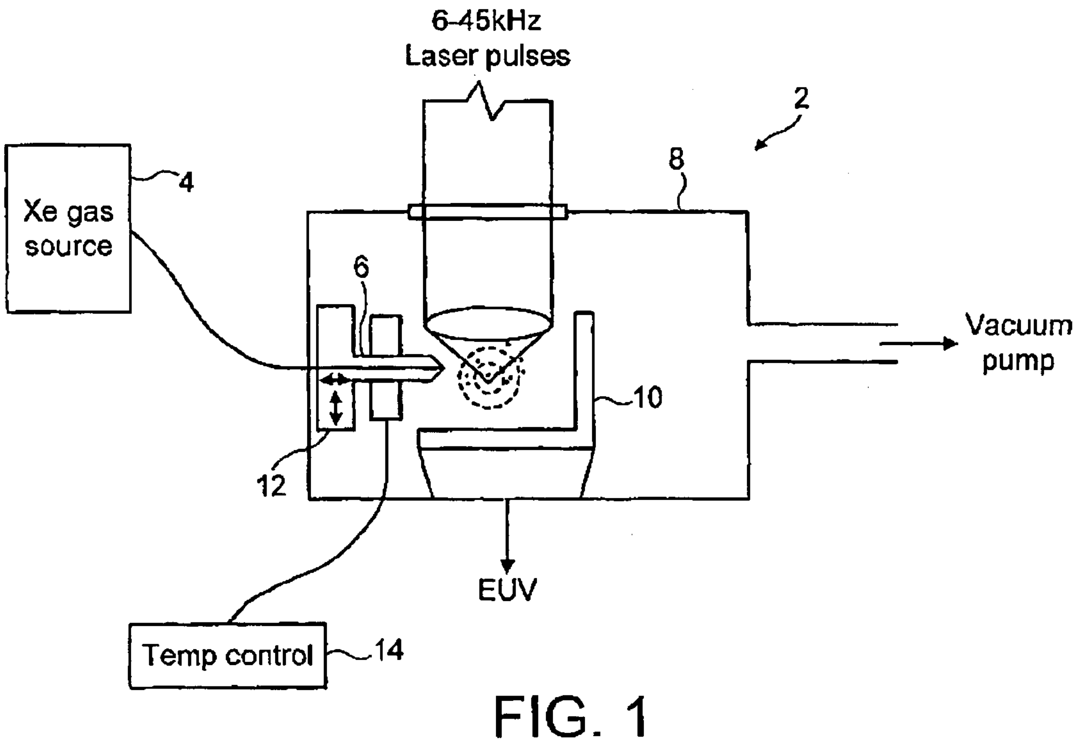
FIG. 1 is a schematic illustration of an apparatus for generating extreme ultraviolet light.

FIG. 1 shows an apparatus 2 for generating extreme ultraviolet light. This apparatus 2 operates by directing a flow of high pressure Xenon gas (for example at a pressure of 10 to 70 bar) from a Xenon gas source 4 through a nozzle 6 and into the interior of a low pressure chamber 8. As the Xenon gas emerges from the nozzle 6 it is cooled to an extent whereby matter suitable for use as a target for generating a plasma is formed. This matter may be in the form of clusters of Xenon atoms. A high power stream of high repetition rate laser pulses from a single or multiplexed lasers is focused onto the Xenon atom clusters. The repetition rate is preferably between 1 kHz and 100 kHz, more preferably between 2 kHz and 20 kHz and achieved in single or multiplex configuration. This heats the Xenon atom clusters to a degree where a plasma forms, this plasma then emitting extreme ultraviolet radiation. Collection optics 10 serve to gather this extreme ultraviolet radiation for use within other systems, such as an integrated circuit lithography system. The optics 10 may comprise a mirror or mirrors.

The nozzle 6 is mounted upon a translation stage 12 which allows the nozzle to be accurately positioned close to the focus point of the laser light such that the laser light is focused where the number density of Xenon clusters is high. A photodiode (or other detector) can be provided to detect the focal point and allow automatic or closed loop control of the translation stage position in combination with a controller such as a microprocessor. The nozzle 6 is also cooled by a temperature controller 14 to a temperature at which the background Xenon gas within the low pressure chamber 8 condenses upon the surface of the nozzle 6. The flow of gas through the nozzle 6 is continuous at a rate of up to 30 standard liters per minute. A vacuum pump system connected to the low pressure chamber 8 servers to evacuate the low pressure chamber 8 to remove the Xenon gas continuously flowing into the low pressure chamber 8.

Figure 2:
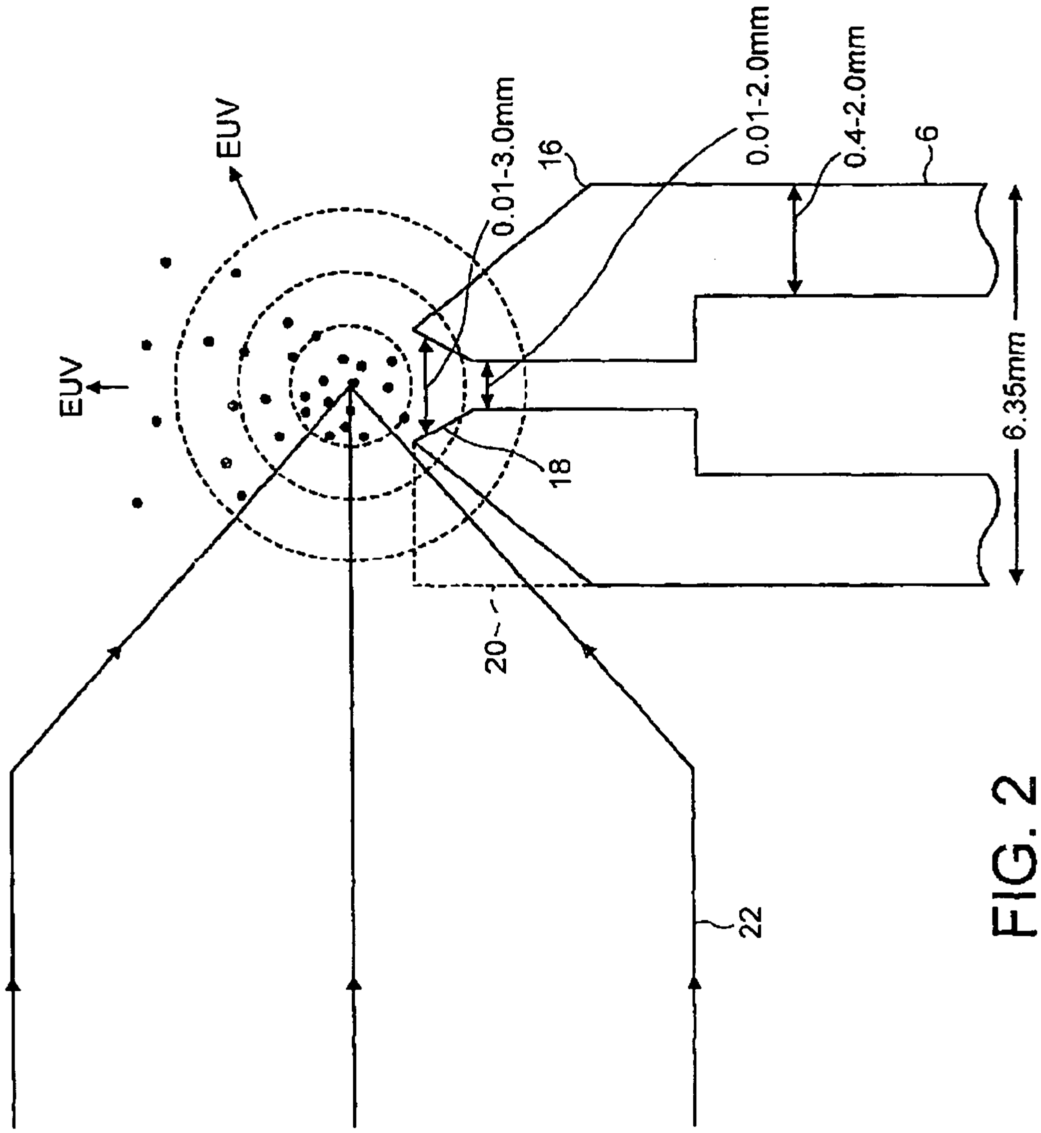
FIG. 2 is a schematic illustration of the geometry of a nozzle within the apparatus of FIG. 1.

FIG. 2 schematically illustrates the nozzle 6 in more detail. As shown, the nozzle 6 has an outer beveled rim 16 and an inner beveled rim 18. The dotted line 20 shows where the outer rim of the nozzle 6 would lie if the outer rim were not beveled. More particularly, the outer surface of the nozzle 6 would extend flush with the outlet of the nozzle to a point bounded by the outer radial diameter of the nozzle 6. Such an outer rim would block a significant portion of the incident laser light 22 used to generate the plasma.

However, the geometry of the nozzle and laser light focusing optics is such that a beveled outer rim 16 is provided to avoid the nozzle 6 obstructing the incident laser light. It will also be seen that the beveled outer rim 16 and the beveled inner rim 18 are at a comparatively acute angle to the plasma and accordingly may suffer less damage from the plasma ejecta.

Thus, the nozzle 6 with the beveled outer rim 16 enables the focus point of the laser light to be brought close to the nozzle outlet without the nozzle obstructing the laser light, even in the laser where there are multiple lasers. That provides less nozzle erosion and hence debris which may reach, and contaminate, the collection optics 10.

The nozzle 6 is conveniently manufactured in a form having a circular cross section using turning techniques. The outer beveled rim 16 has a flat profile and extends around the complete circumference of the nozzle 6. Possible ranges for dimensions of different portions of the nozzle 6 are illustrated in FIG. 2.

Figure 3:
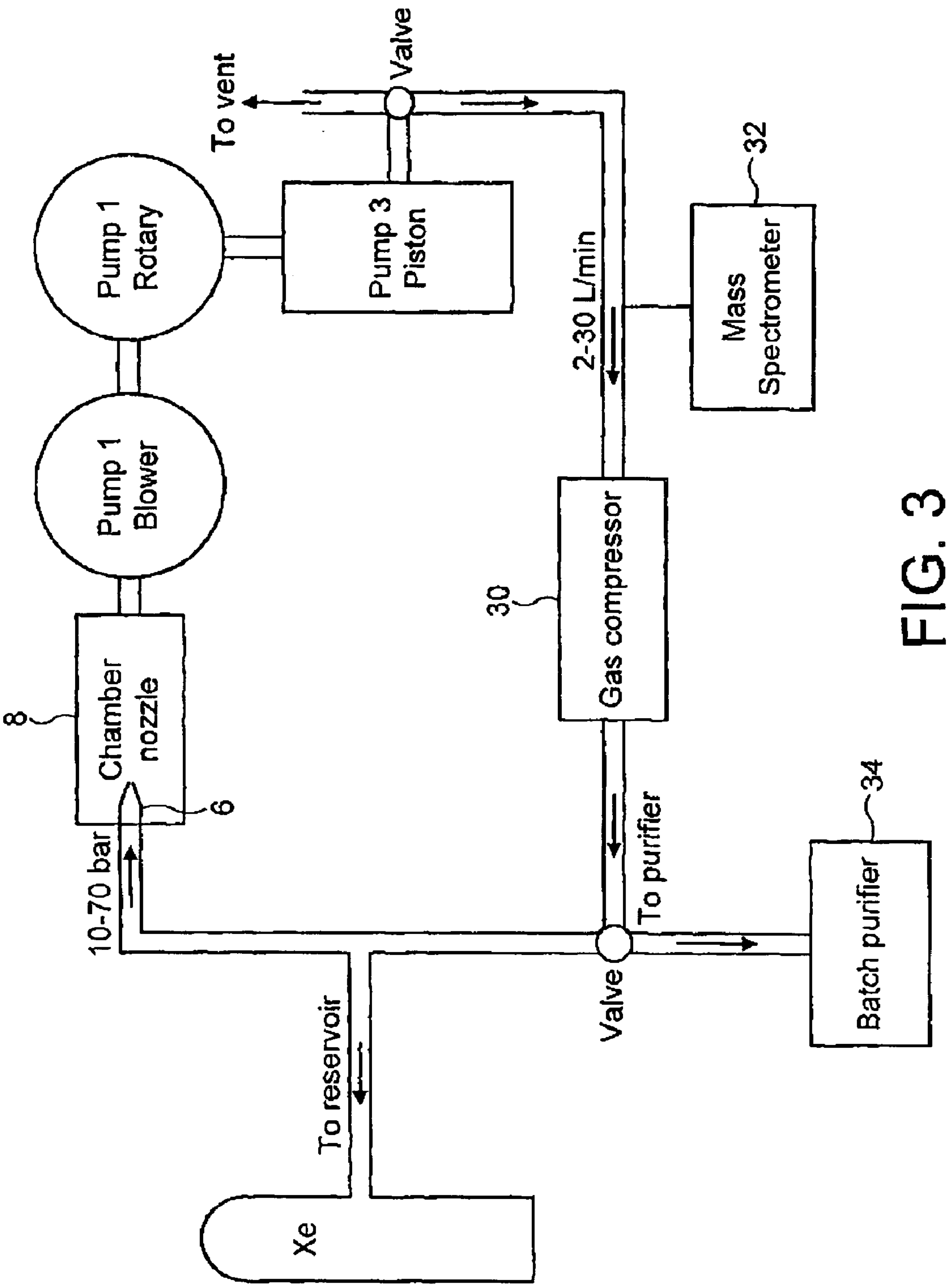
FIG. 3 is a schematic illustration of a gas handling system for use with the apparatus of FIG. 1.

FIG. 3 illustrates a gas system for use with the EUV generator 2 of FIG. 1. A recirculating gas system is used in which series connected blower, rotary and piston pumps serve to continuously evacuate the low pressure chamber 8. The pump set includes Roots blower pumps, rotary pumps, and a four stage piston/cylinder pump amongst other elements. This combination serves to provide the capacity to evacuate the low pressure chamber 8 keeping pace with the continuous flow rate of 2 to 30 standard liters per minute of Xenon into the low pressure chamber 8 through the nozzle 6.

A gas compressor 30 recompresses the Xenon gas evacuated from the low pressure chamber 8 up to the pressure of between 10 and 70 bar at which it is fed back to the nozzle 6. This continuous recirculation of the Xenon gas is practically significant as Xenon gas is an expensive raw material and the continuous operation of the apparatus 2 would be economically compromised if the Xenon gas were not recirculated. A mass spectrometer 32 or residual gas analysis (RGA) sensor serves to continuously monitor the purity of the Xenon gas flowing through the gas system and when this purity falls below a threshold level initiates purification of at least a portion of the Xenon gas using a batch purifier 34.

Although an exemplary embodiment of the extreme ultraviolet radiation generator of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. An apparatus for generating electromagnetic radiation at or below ultraviolet wavelengths, said apparatus comprising:
- a low pressure chamber;
- a nozzle projecting into said low pressure chamber and operable to pass a fluid at high pressure from a nozzle outlet into said low pressure chamber, said fluid being subject to cooling through expansion to yield matter suitable for use as a laser target; and
- one or more optical elements operable to focus laser light onto said matter to generate a plasma emitting electromagnetic radiation at or below ultraviolet wavelengths; wherein said nozzle has a beveled outer rim portion and said one or more optical elements are disposed to focus said laser light onto said matter along a converging path which would be at least partially blocked by an outer rim flush with said nozzle outlet at an outer diameter of said nozzle that would be present if said nozzle did not have said beveled outer rim portion.

2. An apparatus as defined in claim 1, wherein an outer wall of said beveled outer rim portion forms a complete beveled outer rim to said nozzle.

3. An apparatus as defined in claim 1, wherein said nozzle has a circular cross-section.

4. An apparatus as defined in claim 1, wherein said beveled outer rim portion has a flat profile.

5. An apparatus as defined in claim 1, wherein said beveled outer rim portion is sloped at an angle greater than an angle of convergence of said laser light.

6. An apparatus as defined in claim 1, wherein said nozzle has a beveled inner rim surrounding said nozzle outlet.

7. An apparatus as defined in claim 6, wherein said beveled inner rim shapes said nozzle outlet to have a diameter at an outer end opening into said low pressure chamber of between 0.00001 m and 0.003 m and a diameter and an inner end remote from said low pressure chamber of between 0.00001 m and 0.002 m, said diameter at said outer end being greater than said diameter at said inner end.

8. An apparatus as defined in claim 1, wherein said nozzle outlet has a diameter of between 0.00001 m and 0.002 m.

9. An apparatus as defined in claim 1, wherein said nozzle has a wall thickness of between 0.0004 m and 0.002 m.

10. An apparatus as defined in claim 1, wherein said fluid is a gas.

11. An apparatus as defined in claim 10, wherein said fluid is Xenon gas.

12. An apparatus as defined in claim 1, wherein said electromagnetic radiation is extreme ultraviolet light.

13. An apparatus as defined in claim 1, wherein said apparatus is part of an integrated circuit lithography system.

14. An apparatus as defined in claim 1, wherein said nozzle is mounted on a translation stage to allow for said nozzle to be moved relative to said one or more optical elements to adjust a focus point of said laser light to be incident upon said matter.

15. An apparatus as defined in claim 14, further comprising:
- a detector arranged to detect the laser focus point; and
- a controller arranged to control movement of the translation stage dependent on the detected focus point.

16. An apparatus for generating electromagnetic radiation comprising:
- a nozzle arranged to expel target matter;
- a laser arranged to direct laser light onto the target matter;
- a detector for detecting a focal point of the laser light; and
- a controller, in which at least one of the nozzle and laser are mounted on a translation stage and the controller is arranged to move the translation stage dependent on the detected focal point.

17. An apparatus for generating electromagnetic radiation at or below ultraviolet wavelengths, said apparatus comprising:
- a low pressure chamber;
- a nozzle projecting into said low pressure chamber and operable to pass a continuous flow of a fluid at high pressure into said low pressure chamber, said fluid being subject to cooling through expansion to yield matter suitable for use as a laser target and gas;
- one or more optical elements operable to direct laser light onto said matter to generate a plasma emitting electromagnetic radiation at or below ultraviolet wavelengths; and
- a fluid recirculation circuit for recirculating fluid from the low pressure chamber back to the nozzle, including a purification unit for purifying the fluid.

18. An apparatus as defined in claim 17, in which the fluid recirculation circuit comprises:
- a gas pumping system comprising at least a series connection of at least one blower pump and another pump operable to evacuate from said low pressure chamber per minute at least an amount of said gas that would occupy 30 liters at atmospheric pressure.

19. An apparatus as defined in claim 18, wherein said gas pumping system comprises:
- at least a series connected blower pump, rotary pump, and piston pump.

20. An apparatus as defined in claim 19, wherein said gas pumping system further comprises;
- a compressor operable to compress said gas to form said fluid that passes through said nozzle.

21. An apparatus as defined in claim 20, further comprising:
- a purification unit for batch purifying said gas.

22. An apparatus as defined in claim 21, wherein gas purity is monitored by a mass spectrometer to detect if gas purity has fallen below a threshold level.

23. An apparatus as defined in claim 22, wherein said purification unit is triggered to purify said gas when gas purity falls below said threshold level.

24. An apparatus as defined in claim 17, wherein said fluid is a gas.

25. An apparatus as defined in claim 24, wherein said fluid is Xenon gas.

26. An apparatus as defined in claim 17, wherein said electromagnetic radiation is extreme ultraviolet light.

27. An apparatus as defined in claim 17, wherein said apparatus is part of a semiconductor lithography system.

28. An apparatus as defined in claim 17, further comprising;
- a pulsed laser source or sources having a repetition of between 1 kHz and 100 kHz more preferably 2 kHz to 20 kHz as a source of said laser light.

29. A method of generating electromagnetic radiation at or below ultraviolet wavelengths, said method comprising the steps of:
- passing a fluid at high pressure into a low pressure chamber through a nozzle, said fluid being subject to cooling through expansion to yield matter suitable for use as a laser target and gas;

focusing laser light onto said matter to generate a plasma emitting electromagnetic radiation at or below ultraviolet wavelengths;

recirculating said fluid from the low pressure chamber to the nozzle via a recirculation circuit including a purification unit; and purifying said gas in said purification unit.

30. An apparatus for generating electromagnetic radiation at or below ultraviolet wavelengths, said apparatus comprising:

a low pressure chamber;

a nozzle projecting into said low pressure chamber and operable to pass a fluid at high pressure into said low pressure chamber, said fluid being subject to cooling through expansion to yield matter suitable for use as a laser target and gas; and one or more optical elements operable to direct laser light onto said matter to generate a plasma emitting electromagnetic radiation at or below ultraviolet wavelengths.

* * * * *